(12) United States Patent
Bhatt et al.

(10) Patent No.: US 10,832,161 B2
(45) Date of Patent: Nov. 10, 2020

(54) METHOD AND SYSTEM OF PROCESSING DATA FOR TRAINING A TARGET DOMAIN CLASSIFIER

(71) Applicant: Conduent Business Services, LLC, Dallas, TX (US)

(72) Inventors: Himanshu Sharad Bhatt, Nagar (IN); Raghuram Krishnapuram, Bangalore (IN)

(73) Assignee: Conduent Business Services, LLC, Florham Park, NJ (US)

(*) Notice: Subject to any disclaimer, the term of this patent is extended or adjusted under 35 U.S.C. 154(b) by 686 days.

(21) Appl. No.: 15/229,832

(22) Filed: Aug. 5, 2016

(65) Prior Publication Data
US 2018/0039906 A1    Feb. 8, 2018

(51) Int. Cl.
*G06N 20/00* (2019.01)
*G06F 16/35* (2019.01)

(52) U.S. Cl.
CPC ............ *G06N 20/00* (2019.01); *G06F 16/35* (2019.01)

(58) Field of Classification Search
CPC ........ G06N 20/00; G06N 3/0454; G06N 3/08; G06F 16/285; G06F 16/35; G06F 16/355; G06F 17/2785; G06K 9/00221; G06K 9/00288; G06K 9/6256; G06K 9/6267
See application file for complete search history.

(56) References Cited

U.S. PATENT DOCUMENTS

| | | | | |
|---|---|---|---|---|
| 7,409,371 B1* | 8/2008 | Heckerman | ............ | G06N 20/00 706/12 |
| 9,646,606 B2* | 5/2017 | Peng | ........................ | G10L 15/08 |
| 10,318,564 B2* | 6/2019 | Chalabi | ................. | G06F 16/334 |
| 2010/0150393 A1* | 6/2010 | Ni | ........................ | G06F 17/2785 382/100 |
| 2012/0159307 A1* | 6/2012 | Chung | ................ | G06F 16/9577 715/234 |

(Continued)

OTHER PUBLICATIONS

J. Jang, D. Brumley, S. Venkataraman, "BitShred: Feature Hashing Malware for Scalable Triage and Semantic Analysis," Oct. 17-21, 2011, ACM, Proceedings of the 18th ACM conference on Computer and communications security, p. 310 (Year: 2011).*

(Continued)

*Primary Examiner* — Miranda M Huang
*Assistant Examiner* — Catherine F Lee
(74) *Attorney, Agent, or Firm* — Jones Robb, PLLC

(57) ABSTRACT

The disclosed embodiments illustrate method and system of processing data by a computing device for training a target domain classifier. The method includes extracting one or more first features and one or more second features from a first target instance, associated with a target domain. The method further includes predicting a first label for the received first target instance based on the one or more first features by utilizing a trained first classifier associated with a set of labeled source instances, wherein the predicted first label is assigned to the first target instance when a first score of the predicted first label exceeds a first pre-specified threshold. Further, the method includes updating a set of labeled target instances associated with the target domain based on the labeled first target instance, wherein the updated set of labeled target instances is utilized to train the target domain classifier.

18 Claims, 5 Drawing Sheets

(56) References Cited

U.S. PATENT DOCUMENTS

2016/0078359 A1* 3/2016 Csurka .................. G06N 7/005
　　　　　　　　　　　　　　　　　　706/12

OTHER PUBLICATIONS

Sinno Jialin Pan and Qiang Yang, 2010. A survey on transfer learning. *Knowledge and Data Engineering, IEEE Transactions on*, 22(10); 1345-1359.

H. S. Bhatt, D. Semwal, and S. Roy. 2015. An iterative similarity based adaptation technique for cross-domain text classification. In Proceedings of CoNLL.

J. Blitzer, M. Dredze, and F. Pereira. 2007a. Biographies, bollywood, boomboxes and blenders: Domain adaptation for sentiment classification. In Proceedings of Association for Computational Linguistics, pp. 187-205.

Avrim Blum. 1996. On-line algorithms in machine learning. In in Proceedings of the Workshop on On-Line Algorithms, Dagstuhl, pp. 306-325.

Shai Shalev-Shwartz. 2012. Online learning and online convex optimization. Foundations and Trends in Machine Learning, 4(2):107-194.

P. Zhao and S. Hoi. 2010. OTL: A framework of online transfer learning. In Proceedings of International Conference on Machine Learning, pp. 1231-1238.

Pinar Donmez and Jaime G. Carbonell. 2008a. Pairedsampling in density-sensitive active learning. In International Symposium on Artificial Intelligence and Mathematics.

Pinar Donmez and Jaime G. Carbonell. 2008b. Proactive learning: Cost-sensitive active learning with multiple imperfect oracles. In Proceedings of Conference on Information and Knowledge Management, pp. 619-628.

\* cited by examiner

METHOD AND SYSTEM OF PROCESSING DATA FOR TRAINING A TARGET DOMAIN CLASSIFIER

TECHNICAL FIELD

The presently disclosed embodiments are related, in general, to data processing. More particularly, the presently disclosed embodiments are related to method and system for processing data by a computing device for training a target domain classifier.

BACKGROUND

Mostly, machine learning (ML) based automation systems are supervised systems, and primarily rely on labeled examples coded by analysts for learning specific tasks, such as labeling and classifying unseen examples. The idea to use ML-based automation systems has led to significant contributions to domain adaptation and transfer learning (DA/TL) techniques. The DA/TL techniques leverage labeled data from one or more source domains to learn an accurate model for unlabeled data in the target domain.

Typically, systems deploying the DA/TL techniques work on an assumption that the unlabeled data in the target domain is available upfront which may not hold true in most practical applications. In fact, in practically-observed scenarios, the unlabeled data is received sequentially (i.e., one at a time) in real-time, based on user interaction. Thus, an advanced autonomous technique may be desired that may efficiently perform cross-domain classification for real-time unlabeled data.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method of processing data by a computing device for training a target domain classifier. The method includes extracting, by one or more processors in a computing device, one or more first features and one or more second features from a first target instance, associated with a target domain, received from another computing device. The method further includes predicting, by the one or more processors in the computing device, a first label for the received first target instance based on the one or more first features by utilizing a trained first classifier associated with a set of labeled source instances, wherein the predicted first label is assigned to the first target instance when a first score of the predicted first label exceeds a first pre-specified threshold, wherein the first score is determined based on a ratio between a count of the one or more first features and a total count of the one or more first features and the one or more second features, wherein the first label is assigned to the one or more second features. Further, the method includes updating, by the one or more processors in the computing device, a set of labeled target instances associated with the target domain based on the labeled first target instance, wherein the updated set of labeled target instances is utilized to train the target domain classifier when a cumulative value associated with the set of labeled target instances exceeds a pre-specified threshold value.

According to embodiments illustrated herein, there is provided a system for processing data by a computing device for training a target domain classifier. The system includes one or more processors configured to extract one or more first features and one or more second features from a first target instance, associated with a target domain, received from another computing device. The one or more processors are further configured to predict a first label for the received first target instance based on the one or more first features by utilizing a trained first classifier associated with a set of labeled source instances, wherein the predicted first label is assigned to the first target instance when a first score of the predicted first label exceeds a first pre-specified threshold, wherein the first score is determined based on a ratio between a count of the one or more first features and a total count of the one or more first features and the one or more second features, wherein the first label is assigned to the one or more second features. The one or more processors are further configured to update a set of labeled target instances associated with the target domain based on the labeled first target instance, wherein the updated set of labeled target instances is utilized to train the target domain classifier when a cumulative value associated with the set of labeled target instances exceeds a pre-specified threshold value.

According to embodiments illustrated herein, there is provided a computer program product for use with a computing device. The computer program product comprises a non-transitory computer readable medium storing a computer program code for of data processing for training a target domain classifier. The computer program code is executable by one or more processors in a computing device to extract one or more first features and one or more second features from a first target instance, associated with a target domain, received from another computing device. The computer program code is further executable by the one or more processors in the computing device to predict a first label for the received first target instance based on the one or more first features by utilizing a trained first classifier associated with a set of labeled source instances, wherein the predicted first label is assigned to the first target instance when a first score of the predicted first label exceeds a first pre-specified threshold, wherein the first score is determined based on a ratio between a count of the one or more first features and a total count of the one or more first features and the one or more second features, wherein the first label is assigned to the one or more second features. The computer program code is further executable by the one or more processors in the computing device to update a set of labeled target instances associated with the target domain based on the labeled first target instance, wherein the updated set of labeled target instances is utilized to train the target domain classifier when a cumulative value associated with the set of labeled target instances exceeds a pre-specified threshold value.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
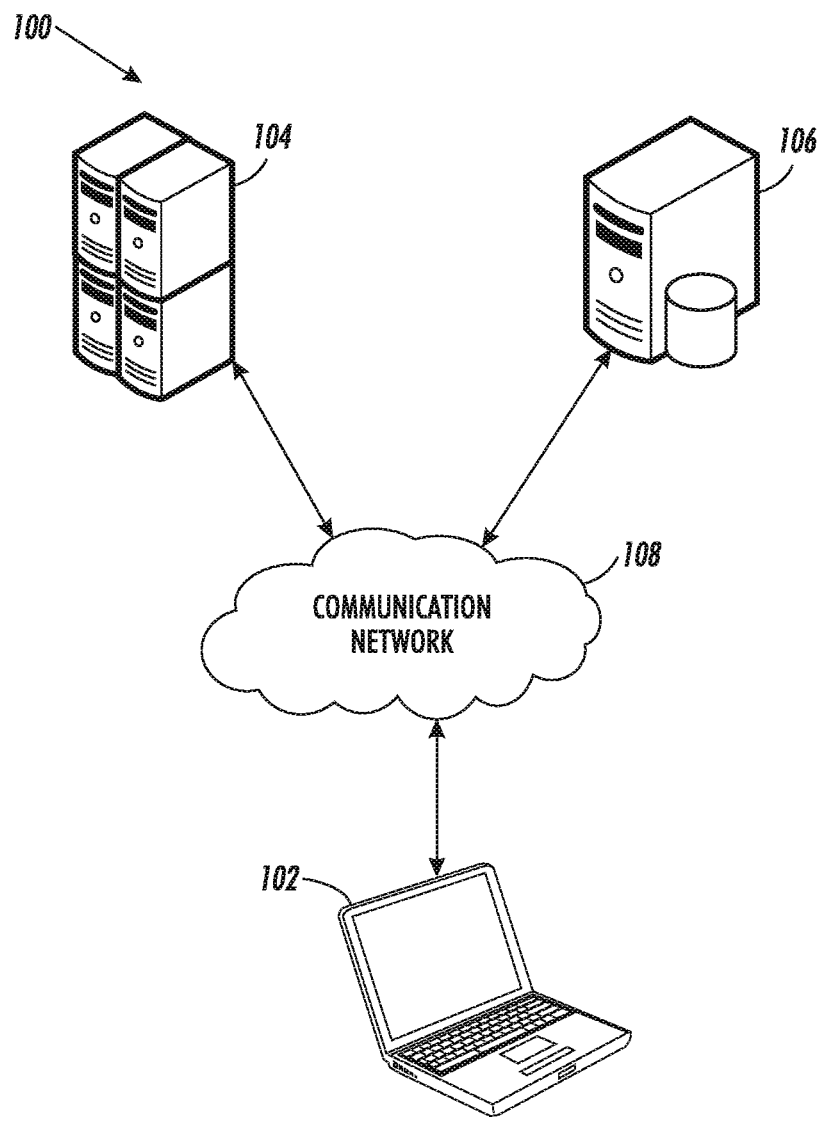
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "user-computing device" refers to a computer, a device (that includes one or more processors/microcontrollers and/ or any other electronic components), or a system (that performs one or more operations according to one or more programming instructions/codes) associated with a user. In an embodiment, the user may utilize the user-computing device to transmit one or more target instances (i.e., a first target instance and a second target instance). Examples of the user-computing device may include, but are not limited to, a desktop computer, a laptop, a personal digital assistant (PDA), a mobile device, a smartphone, and a tablet computer (e.g., iPad® and Samsung Galaxy Tab®).

A "target domain" refers to a technical or business field for which a classifier is to be trained. In an embodiment, data from one or more source domains is utilized to train the classifier for labeling/classifying one or more instances, such as an image, a text segment, or an audio segment, of the target domain.

A "first target instance" corresponds to an image, a text segment, or an audio segment associated with a target domain. In an embodiment, the first target instance may further correspond to real-time data received from a computing device. Further, the first target instance may be utilized to build training data for training a target domain classifier.

"One or more source domains" correspond to various technical or business fields for which a classifier is already trained. In an embodiment, data from the one or more source domains is utilized to train the classifier for labeling/classifying one or more target instances, such as an image, a text segment, or an audio segment, associated with a target domain.

A "set of labeled source instances" comprises instances, such as an image, a text segment, or an audio segment, of one or more source domains that are associated with one or more labels. In an embodiment, the set of labeled source instances is utilized to extract one or more first features and one or more second features from a first target instance associated with a target domain. In an embodiment, the set of labeled source instances may be utilized to label one or more target instances (i.e., the first target instance and/or the second target instance).

A "set of labeled target instances" comprises instances, such as an image, a text segment, or an audio segment, of a target domain that are associated with one or more labels. In an embodiment, the set of labeled target instances may be utilized as training data for training a classifier of the target domain.

"One or more labeled target features" refer to one or more features of a target domain that are associated with at least one label. In an embodiment, the one or more labeled target features are utilized as training data for training a target domain classifier. In a scenario, when a labeled target instance corresponds to a labeled text segment, the one or more labeled target features correspond to one or more labeled keywords, extracted from the labeled text segment. In another scenario, when a labeled target instance corresponds to a labeled audio segment, the one or more labeled target features correspond to one or more labeled keywords uttered in the labeled audio segment. In another exemplary scenario, when a labeled target instance corresponds to a labeled image, the one or more labeled target features correspond to one or more labeled objects, gestures, and/or facial expressions captured in the labeled image.

A "cumulative value" refers to a cost/price factor associated with building training data (i.e., a set of labeled target instances) for training a target domain classifier. In an embodiment, the cumulative value is updated every time some cost is incurred for building the training data. In an embodiment, the training data may be collected as long as the cumulative value is less than a pre-specified threshold value.

A "source domain classifier" refers to a mathematical model that may be configured to label one or more source domain instances. In an embodiment, the source domain classifier may be utilized for labeling any target domain instance that is similar to the one or more source domain instances. Examples of the source domain classifier may include, but are not limited to, a Support Vector Machine (SVM), a Logistic Regression, a Bayesian classifier, a Decision Tree classifier, a Copula-based classifier, a K-Nearest Neighbors (KNN) classifier, or a Random Field (RF) classifier.

A "target domain classifier" refers to a mathematical model that may be configured to label one or more target domain instances. In an embodiment, the target domain classifier is trained based on training data. In an embodiment, the training data may be built by utilizing one or more source domains. Examples of the target domain classifier may include, but are not limited to, a Support Vector Machine (SVM), a Logistic Regression, a Bayesian classifier, a Decision Tree classifier, a Copula-based classifier, a K-Nearest Neighbors (KNN) classifier, or a Random Field (RF) classifier.

"One or more first features" correspond to one or more features, extracted from a first target instance, associated with at least one label. In an embodiment, the one or more first features are included in at least one of: one or more labeled source features and one or more labeled target features. In a scenario, when the first target instance corresponds to a text segment, the one or more first features correspond to one or more keywords, extracted from the text segment, that are already labeled. In another scenario, when the first target instance corresponds to an audio segment, the one or more first features correspond to one or more keywords, uttered in the audio segment, that are already labeled. In another exemplary scenario, when the first target instance corresponds to an image, the one or more first features correspond to one or more objects, gestures, and/or facial expressions, captured in the image, that are already labeled.

"One or more second features" correspond to one or more new features, extracted from a first target instance, independent of labels. Further, the one or more second features are labeled by utilizing one or more trained classifiers associated with one or more source domains and/or external knowledge sources. In a scenario, when the first target instance corresponds to a text segment, the one or more second features correspond to one or more keywords, extracted from the text segment, that are not labeled previously. In another scenario, when the first target instance corresponds to an audio segment, the one or more second features correspond to one or more keywords, uttered in the audio segment, that are unlabeled. In another exemplary scenario, when the first target instance corresponds to an image, the one or more second features correspond to one or more objects, gestures, and/or facial expressions, captured in the image, that are unlabeled. In an embodiment, the one or more second features are labeled to build up training data for training a target domain classifier.

A "trained first classifier" refers to a mathematical model that may be configured to label one or more target domain instances. The trained first classifier may be utilized to predict/assign a first label for/to a first target instance. In an embodiment, the trained first classifier may be trained based on a set of labeled source instances and a set of labeled target instances.

A "first label" refers to a tag predicted/assigned for/to a first target instance by utilizing a trained first classifier. In an embodiment, the first label is predicted/assigned based on one or more first features extracted from the first target instance by use of the trained first classifier.

A "first score" refers to a score associated with a first label of a first target instance. In an embodiment, the first score may be determined based on a ratio between a count of one or more first features and a total count of one or more first features and one or more second features extracted from the first target instance. The first score may indicate a confidence measure with which a trained first classifier predicts the first label for the first target instance.

A "trained second classifier" corresponds to an oracle associated with a source domain that is relevant to a target domain. The trained second classifier may be utilized to predict/assign a second label for/to a first target instance. In an embodiment, the trained second classifier is associated with a first value. Further, the reliability of the trained second classifier depends on the quality and quantity of training data utilized to train the second classifier. In an embodiment, the trained second classifier may be received by querying one or more websites or a source database associated with the relevant source domain.

A "second label" refers to a tag predicted/assigned for/to a first target instance by utilizing a trained second classifier. In an embodiment, the second label is predicted/assigned based on one or more first features and one or more second features extracted from the first target instance.

A "second score" refers to a score associated with a first label of a first target instance. In an embodiment, the second score may indicate a confidence measure with which a trained second classifier predicts the second label for the first target instance associated with a target domain.

A "first value" refers to a utilization cost/price associated with a trained second classifier. In an embodiment, the first value associated with the trained second classifier may depend on the quality and quantity of training data utilized to train the second classifier. For example, a second classifier that is trained based on 1000 source instances may have a higher first value compared with another second classifier that is trained based on 100 source instances.

A "trained third classifier" corresponds to an oracle associated with a target domain. The trained third classifier may be utilized to predict/assign a third label for/to a first target instance. In an embodiment, the trained third classifier is associated with a second value. In an embodiment, the trained third classifier may be received or queried from one or more websites or a target database associated with the target domain. Since, the trained third classifier is trained based on training data associated with the target domain, the confidence level with which the trained third classifier predicts the third label for the first target instance is very high.

A "third label" refers to a tag predicted/assigned for/to a first target instance by utilizing a third classifier. In an embodiment, the third label is predicted/assigned based on one or more first features and one or more second features, extracted from the first target instance, by use of a trained third classifier.

A "second value" refers to a utilization cost/price associated with a trained third classifier. In an embodiment, the second value associated with the trained third classifier may depend on the quality and quantity of training data utilized to train the third classifier. For example, a third classifier that is trained based on 1000 instances of training data may have a higher second value compared with another third classifier that is trained based on 100 instances of the training data. In an embodiment, the second value associated with the trained third classifier may depend on an importance factor associated with the target domain. For example, the second value for a trained third classifier associated with a target domain "defense" may be higher in comparison to another trained third classifier associated with another target domain "entertainment".

A "second target instance" corresponds to an image, a text segment, or an audio segment associated with a target domain. In an embodiment, the second target instance is labeled by using a trained target domain classifier. In an embodiment, the second target instance may correspond to real-time data that is received one at a time from any computing device.

FIG. 1 is a block diagram of a system environment in which various embodiments may be implemented. With reference to FIG. 1, there is shown a system environment 100 that includes one or more user-computing devices, such as a user-computing device 102, one or more application servers, such as an application server 104, one or more database servers, such as a database server 106, and a communication network 108. Various devices in the system environment 100 may be interconnected over the communication network 108. FIG. 1 shows, for simplicity, one user-computing device, such as the user-computing device 102, one application server, such as the application server 104, and one database server, such as the database server 106. However, it will be apparent to a person having ordinary skill in the art that the disclosed embodiments may also be implemented using multiple user-computing devices, multiple application servers, and multiple database servers, without departing from the scope of the disclosure.

The user-computing device 102 may refer to a computing device (associated with a user) that may be communicatively coupled to the communication network 108. The user-computing device 102 may include one or more processors and one or more memories. The one or more memories may include a computer readable code that may be executable by the one or more processors to perform one or more operations. In an embodiment, the one or more operations may include transmitting one or more target instances to the application server 104 or storing the one or more target instances in the application server 104. In an embodiment, the one or more target instances may correspond to an image, a text segment, or an audio segment. Further, the one or more target instances are associated with a target domain. In an embodiment, the one or more target instances may comprise a set of first target instances and a set of second target instances. The set of first target instances is utilized for training a target domain classifier. And after training, the target domain classifier may be utilized to label each second target instance in the set of second target instances. Further, the user may utilize the user-computing device 102 to transmit/store one target instance, of the one or more target instances, at a time (i.e., real-time transmission of the one or more target instances).

The user-computing device 102 may correspond to a variety of computing devices, such as, but not limited to, a laptop, a PDA, a tablet computer, a smartphone, and a phablet.

A person having ordinary skill in the art will understand that the scope of the disclosure is not limited to the utilization of the user-computing device 102 by a single user. In an embodiment, the user-computing device 102 may be utilized by more than one user to transmit the first target instance.

The application server 104 may refer to a computing device or a software framework hosting an application or a software service that may be communicatively coupled to the communication network 108. In an embodiment, the application server 104 may be implemented to execute procedures, such as, but not limited to, programs, routines, or scripts stored in one or more memories for supporting the hosted application or the software service. In an embodiment, the hosted application or the software service may be configured to perform one or more predetermined operations of data processing for training the target domain classifier. For training the target domain classifier, the application server 104 may be configured to extract one or more first features and one or more second features from a first target instance, in the set of first target instances, received from the user-computing device 102. In an embodiment, the one or more first features are associated with a set of labeled source instances or a set of labeled target instances. Further, the one or more second features are independent of the set of labeled source instances and the set of labeled target instances. In an embodiment, the application server 104 may be configured to query the database server 106 to retrieve the set of labeled source instances and the set of labeled target instances. The set of labeled target instances may be associated with a cumulative value. The cumulative value may correspond to a price or cost incurred for building training data (i.e., the set of labeled target instances) for the target domain classifier.

After feature extraction, in an embodiment, the application server 104 may be configured to predict a first label for the received first target instance based on the one or more first features. The application server 104 may utilize a trained first classifier to predict the first label. In an embodiment, the trained first classifier may be trained based on one or more labeled source features associated with the set of labeled source instances and/or one or more labeled target features associated with the set of labeled target instances. Further, the set of labeled source instances may be associated with one or more source domains and the set of labeled target instances may be associated with the target domain.

In an embodiment, the trained first classifier may further determine a first score for the predicted first label based on a ratio between a count of the one or more first features and a total count of the one or more first features and the one or more second features. The application server 104 may be further configured to assign the first label to the first target instance and further to the one or more second features when the first score exceeds a first pre-specified threshold.

In another embodiment, when the first score is less than the first pre-specified threshold, the application server 104 may predict a second label for the first target instance based on the one or more first features and the one or more second features. For the prediction, the application server 104 may utilize a trained second classifier associated with a source domain of the one or more source domains. The application server 104 may be further configured to determine a second score for the second label. In an embodiment, the application server 104 may be configured to assign the second label to the first target instance when the second score for the second label exceeds a second pre-specified threshold. Further, the application server 104 may be configured to update the cumulative value associated with the set of labeled target instances by adding a first value associated with the trained second classifier to the cumulative value. In an embodiment, the first value may correspond to a utilization price/cost of the trained second classifier.

In yet another embodiment, when the second score of the second label is less than the second pre-specified threshold, the application server 104 may be further configured to predict a third label for the first target instance based on the one or more first features and the one or more second features. The application server 104 may utilize a trained third classifier for the prediction of the third label. The third classifier may be associated with the target domain. Thereafter, the third label is assigned to the first target instance. Further, the application server 104 may be configured to update the cumulative value associated with the set of labeled target instances by adding a second value associated with the trained third classifier to the cumulative value. In an embodiment, the second value may correspond to a utilization price/cost of the trained third classifier.

After labeling the first target instance, the application server 104 may be configured to update the set of labeled target instances by adding the labeled first target instance to the set of labeled target instances. Also, the application server 104 may be configured to label the one or more second features with the assigned label of the first target instance. Further, the application server 104 may be configured to update the one or more labeled target features by adding the labeled one or more second features to the one or more labeled target features. In an embodiment, the application server 104 may be configured to store the updated set of labeled target instances and the updated one or more labeled target features in the database server 106.

Thereafter, the application server 104 may be configured to compare the cumulative value, associated with the set of labeled target instances, with a pre-specified threshold value. In an embodiment, the pre-specified threshold value may correspond to a budget constraint as specified by the user for training the target domain classifier. In an embodiment, when the cumulative value is less than the pre-specified threshold value the application server 104 may be configured to label another first target instance. In an alternate embodiment, when the cumulative value exceeds the pre-specified threshold value the application server 104 may utilize the updated set of labeled target instances and the updated one or more labeled target features to train the target domain classifier. After training, the application server 104 may be configured to utilize the trained target domain classifier to label target instances in the set of second target instances received one at a time from the user-computing device 102.

The application server 104 may be realized through various types of application servers, such as, but not limited to, a Java application server, a .NET framework application server, a Base4 application server, a PHP framework application server, or any other application server framework. An embodiment of the structure of the application server 104 has been discussed later in FIG. 2.

A person having ordinary skill in the art will appreciate that the scope of the disclosure is not limited to realizing the application server 104 and the user-computing device 102, as separate entities. In an embodiment, the application server 104 may be realized as an application program installed on and/or running on the user-computing device 102, without deviating from the scope of the disclosure.

The database server 106 may refer to a computing device that may be communicatively coupled to the communication network 108. In an embodiment, the database server 106 may be configured to perform one or more database operations. The one or more database operations may include one or more of, but not limited to, receiving, storing, processing, and transmitting one or more queries, data, or content. The one or more queries, data, or content may be received/transmitted from/to various components of the system environment 100. In an embodiment, the database server 106 may be configured to store the set of labeled source instances and the set of labeled target instances. In an embodiment, the database server 106 may be further configured to store the one or more labeled source features and the one or more labeled target features. In an embodiment, the database server 106 may receive one or more queries from the application server 104 for the retrieval of the set of labeled source instances, the set of labeled target instances, the one or more labeled source features and the one or more labeled target features. In an embodiment, the database server 106 may further receive the one or more queries from the application server 104 to update the set of labeled target instances and the one or more labeled target features.

For querying the database server 106, one or more querying languages, such as, but not limited to, SQL, QUEL, and DMX, may be utilized. In an embodiment, the database server 106 may connect to the application server 104, using one or more protocols, such as, but not limited to, the ODBC protocol and the JDBC protocol. In an embodiment, the database server 106 may be realized through various technologies such as, but not limited to, Microsoft® SQL Server, Oracle®, IBM DB2®, Microsoft Access®, PostgreSQL®, MySQL® and SQLite®.

A person having ordinary skill in the art will appreciate that the scope of the disclosure is not limited to realizing the database server 106 and the application server 104 as separate entities. In an embodiment, the functionalities of the database server 106 can be integrated into the application server 104, without departing from the scope of the disclosure.

The communication network 108 may correspond to a medium through which content and messages flow between various devices, such as the user-computing device 102, the application server 104, and the database server 106, of the system environment 100. Examples of the communication network 108 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the communication network 108 in accordance with various wired and wireless communication protocols such as Transmission Control Protocol and Internet Protocol (TCP/IP), User Datagram Protocol (UDP), and 2G, 3G, or 4G communication protocols.

Figure 2:
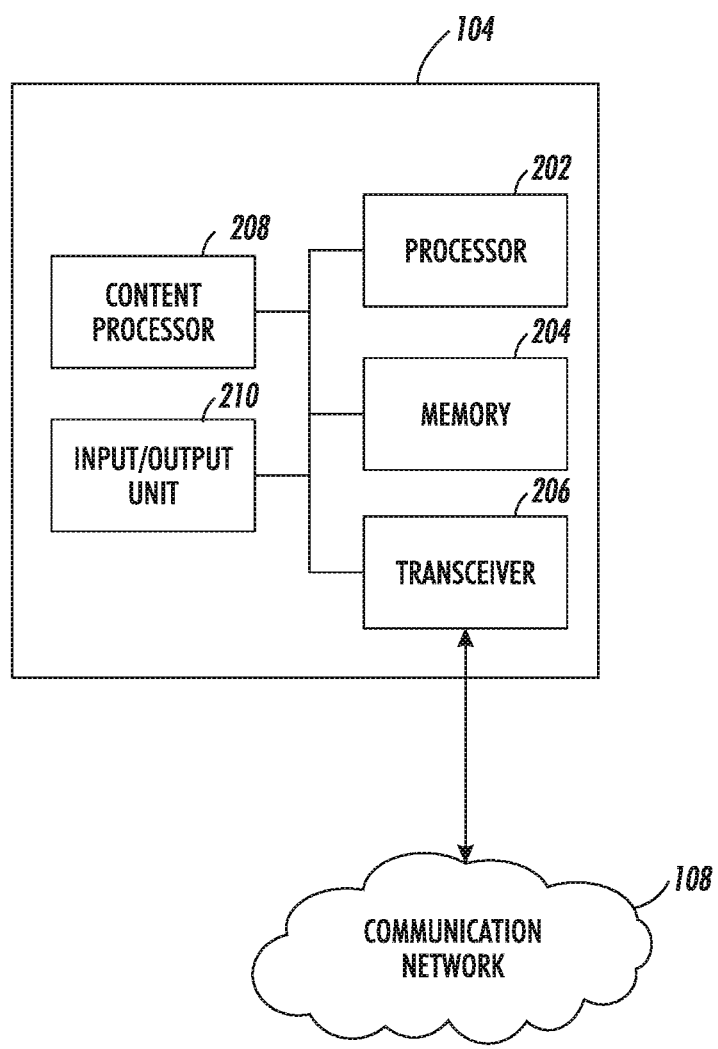
FIG. 2 is a block diagram that illustrates an application server, in accordance with at least one embodiment.

FIG. 2 is a block diagram that illustrates an application server, in accordance with at least one embodiment. FIG. 2 has been described in conjunction with FIG. 1. With reference to FIG. 2, there is shown a block diagram of the application server 104 that may include a processor 202, a memory 204, a transceiver 206, a content processor 208, and an input/output unit 210. The processor 202 is communicatively coupled to the memory 204, the transceiver 206, the content processor 208, and the input/output unit 210.

The processor 202 includes suitable logic, circuitry, and/or interfaces that are configured to execute one or more instructions stored in the memory 204. The processor 202 may further comprise an arithmetic logic unit (ALU) (not shown) and a control unit (not shown). The ALU may be coupled to the control unit. The ALU may be configured to perform one or more mathematical and logical operations and the control unit may control the operation of the ALU. The processor 202 may execute a set of instructions/programs/codes/scripts stored in the memory 204 to perform one or more operations for training the target domain classifier. In an embodiment, the processor 202 may utilize one or more classifiers, such as the trained first classifier, the trained second classifier, and/or the trained third classifier for predicting/assigning the label (i.e., the first label or the second label or the third label) for/to the first target instance. In an embodiment, the processor 202 may be configured to update the set of labeled target instances and the one or more labeled target features. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions that are executable by the processor 202, the transceiver 206, the content processor 208, and the input/output unit 210. In an embodiment, the memory 204 may include one or more buffers (not shown). The one or more buffers may store the one or more first features and the one or more second features. In an embodiment, the one or more buffers may further store the first score and the second score associated with the first target instance. Examples of some of the commonly known memory implementations may include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations for training the target domain classifier. It will be apparent to a person having ordinary skill in the art that the one or more instructions stored in the memory 204 may enable the hardware of the application server 104 to perform the one or more predetermined operations, without deviating from the scope of the disclosure.

The transceiver 206 transmits/receives messages and data to/from various components, such as the user-computing device 102 and the database server 106 of the system environment 100, over the communication network 108. In an embodiment, the transceiver 206 may be communicatively coupled to the communication network 108. In an embodiment, the transceiver 206 may be configured to receive the one or more target instances from the user-computing device 102. Examples of the transceiver 206 may include, but are not limited to, an antenna, an Ethernet port, a Universal Serial Bus (USB) port, or any other port configured to receive and transmit data. The transceiver 206 transmits/receives the messages and data, in accordance with the various communication protocols, such as TCP/IP, UDP, and 2G, 3G, or 4G communication protocols.

The content processor 208 includes suitable logic, circuitry, and/or interfaces that are configured to execute the one or more sets of instructions stored in the memory 204. In an embodiment, the content processor 208 may be configured to extract the one or more first features and the one or more second features from the received first target instance. In an embodiment, the content processor 208 may utilize one or more content processing techniques, such as text processing techniques, image processing techniques, and/or audio processing techniques, known in the art for the extraction of the one or more first features and the one or more second features. The content processor 208 may be implemented based on a number of processor technologies known in the art. Examples of the content processor 208 may include, but are not limited to, a word processor, an X86-based processor, a RISC processor, an ASIC processor, and/or a CISC processor.

A person having ordinary skill in the art will appreciate that the scope of the disclosure is not limited to realizing the content processor 208 and the processor 202 as separate entities. In an embodiment, the content processor 208 may be implemented within the processor 202, without departing from the spirit of the disclosure. Further, a person skilled in the art will understand that the scope of the disclosure is not limited to realizing the content processor 208 as a hardware component. In an embodiment, the content processor 208 may be implemented as a software module included in computer program code (stored in the memory 204), which may be executable by the processor 202 to perform the functionalities of the content processor 208.

The input/output unit 210 may comprise suitable logic, circuitry, interfaces, and/or code that may be configured to provide an output to the user and/or the service provider. The input/output unit 210 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker. The working of the application server 104 for processing the data for training the target domain classifier has been explained later in FIGS. 3A and 3B.

Figure 3A:
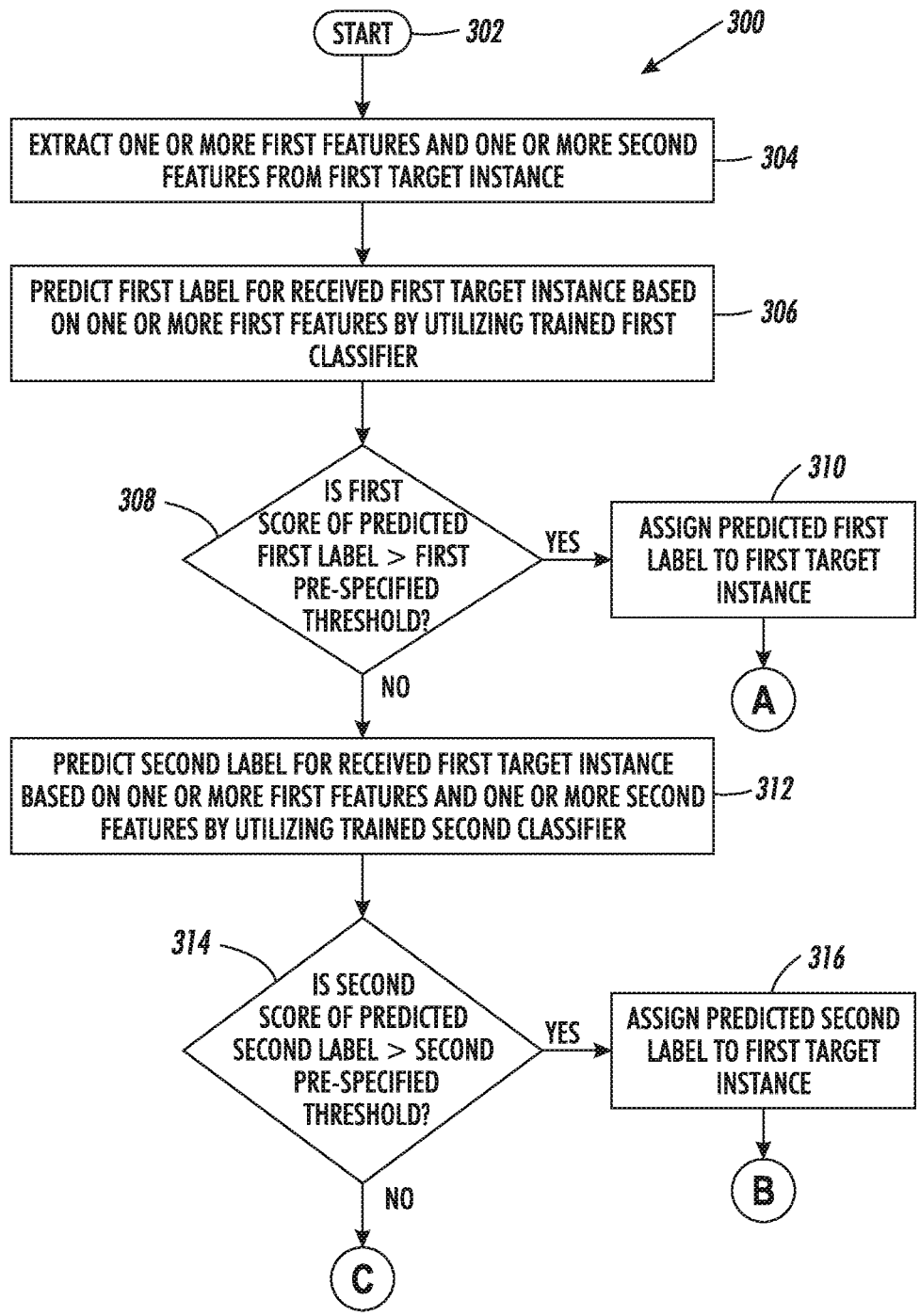
FIGS. 3A and 3B, collectively, depict a flowchart that illustrates a method of processing data for training a target domain classifier, in accordance with at least one embodiment.
Figure 3B:
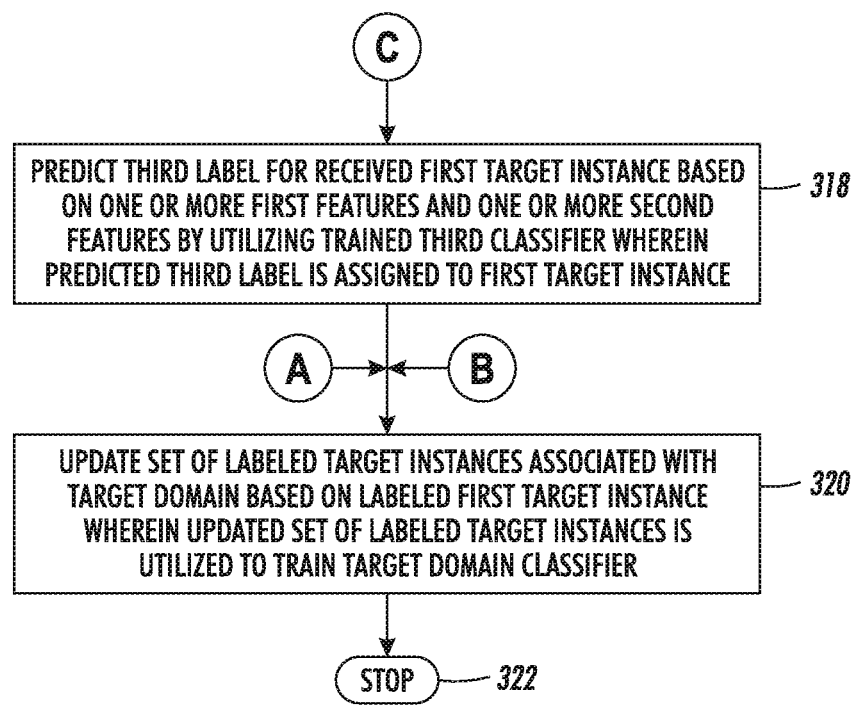

FIGS. 3A and 3B, collectively, depict a flowchart that illustrates a method of processing data for training a target domain classifier, in accordance with at least one embodiment. FIGS. 3A and 3B are collectively described in conjunction with FIG. 1 and FIG. 2. With reference to FIGS. 3A and 3B, there is shown a flowchart 300 that illustrates a method of processing data for training the target domain classifier. A person having ordinary skill in the art will understand that the examples, as described in FIGS. 3A and 3B, are for illustrative purpose and should not be construed to limit the scope of the disclosure. The method starts at step 302 and proceeds to step 304.

At step 304, the one or more first features and the one or more second features are extracted from the first target instance. In an embodiment, the content processor 208, in conjunction with the processor 202, may be configured to extract the one or more first features and the one or more second features from the first target instance.

Prior to the extraction of the one or more first features and the one or more second features, the processor 202, in conjunction with the transceiver 206, may be configured to receive the first target instance from the user-computing device 102. In an embodiment, the received first target instance may correspond to an image, a text segment, or an audio segment. Further, the transceiver 206 may be configured to query the application server 104 for the retrieval of the set of labeled source instances, the set of labeled target instances, the one or more labeled source features, and the one or more labeled target features.

In an embodiment, the one or more labeled source features may correspond to labeled features associated with source instances in the set of labeled source instances. For example, if the set of labeled source instances corresponds to a set of labeled source text segments, one or more keywords that appear in the set of labeled source text segments may correspond to the one or more labeled source features. Further, one source feature may be associated with one or more labels. In an embodiment, the processor 202 may be configured to determine a source feature log based on the one or more labeled source features. In an embodiment, [$x_i$, M, N, O, . . . ] may represent the format of the source feature log, where $x_i$ may represent a labeled source feature and "M", "N", "O" may correspond to a count of times the labeled source feature $x_i$ is associated with different labels. The processor 202 may store the source feature log in the memory 204.

In an embodiment, the one or more labeled target features may correspond to labeled features associated with target instances in the set of labeled target instances. For example, if the set of labeled target instances corresponds to a set of labeled target text segments, one or more keywords in the set of labeled target text segments may correspond to the one or more labeled target features. In an embodiment, the processor 202 may be configured to determine a target feature log based on the one or more labeled target features. In an embodiment, [$x_i$, M, N, O, . . . ] may represent the format of the target feature log, where $x_i$ may represent a labeled target feature and "M", "N", "O" may correspond to a count of times the labeled target feature $x_i$ may be associated with different labels. In an embodiment, the content processor 208 may utilize the one or more labeled source features and the one or more labeled target features to extract the one or more first features and the one or more second features from the first target instance.

A person having ordinary skill in the art will understand that if no first target instance is labeled previously, the set of labeled target instances may correspond to an empty set. Thus, when the transceiver 206 received a first target instance for a first time, the content processor 208 may only utilize the one or more labeled source features to extract the one or more first features and the one or more second features from the first target instance.

In an embodiment, the extracted one or more first features may be observed in either the one or more labeled source features or the one or more labeled target features. Thus, the extracted one or more first features may be associated with either the set of labeled source instances or the set of labeled target instances. Further, the one or more second features correspond to new features that may be independent of the set of labeled source instances and the set of labeled target instances. Thus, the one or more second features correspond to unlabeled features associated with the target domain.

In an exemplary scenario, when the received first target instance corresponds to a text segment, the content processor 208 may extract one or more first keywords and one or more second keywords from the text segment. The extracted one or more first keywords may correspond to the one or more first features and the extracted one or more second keywords may correspond to the one or more second features. The one or more first keywords may be observed either in one or more labeled source keywords (i.e., the one or more labeled source features) or one or more labeled target keywords (i.e., the one or more labeled target features). Further, the one or more second keywords have appeared for a first time in the target domain and thus, may not be associated with the set of labeled source instances and the set of labeled target instances. In an embodiment, the content processor 208 may utilize one or more text processing algorithms, such as bag of words extraction, for the extraction of the one or more first keywords and the one or more second keywords from the first target instance.

In another exemplary scenario, when the received first target instance corresponds to an image/audio segment, the content processor 208 may utilize one or more image/audio processing techniques for the extraction of the one or more first features and the one or more second features from the received first target instance.

A person having ordinary skill in the art will understand that the abovementioned exemplary scenarios are for illustrative purpose and should not be construed to limit the scope of the disclosure.

At step 306, the first label is predicted for the received first target instance based on the one or more first features by utilizing the trained first classifier. In an embodiment, the processor 202 may be configured to predict the first label for the received first target instance. The processor 202 may predict the first label based on the one or more first features by utilizing the trained first classifier. In an embodiment, the trained first classifier may be trained based on the one or more labeled source features and/or the one or more labeled target features. The trained first classifier may further utilize the source feature log and the target feature log as a lookup for predicting the first label for the first target instance by using equation (1) as shown below:

$$Y = \underset{y \in Y}{\mathrm{argmax} P(Y = y_k)} \prod_i P(x_i^l | Y = y_k) \quad (1)$$

where,

Y represents the predicted first label;

$x_i^l$ represents an $i^{th}$ feature in the one or more first features of the first target instance; and $y_k$ represents a label associated with a feature same as $x_i^l$ in the source feature log and/or the target feature log with a maximum count. In a scenario, a target feature log [$x_i$, 10, 7, 34] with respect to a labeled feature $x_i$ may have a maximum count "34" for a label "l". In this scenario, $y_k$ for the feature $x_i$ similar to $x_i^l$ may be "l".

Based on equation (1), the trained first classifier may associate each of the one or more first features with a corresponding label and thereafter predicts a label (i.e., the first label) that is associated with a maximum count of the one or more first features. For example, based on the source feature log and/or the target feature log, the trained first classifier determines that a label "l" is associated with "5" first features, another label "m" is associated with "3" first features, and another label "n" is associated with "10" first features of the first target instance. Thus, the trained first classifier may predict the first label as "n" for the first target instance.

A person having ordinary skill in the art will understand that the abovementioned example is for illustrative purpose and should not be construed to limit the scope of the disclosure.

After the prediction of the first label, the processor 202 may be configured to determine the first score for the predicted first label. In an embodiment, the processor 202 may determine the first score $\alpha$ based on the ratio (determined based on equation (2), as shown below) of the count of the one or more first features and a total count of the one or more first features and the one or more second features extracted from the first target instance.

$$\theta_c = \frac{|x_{ff}^t|}{|x^t|} \quad (2)$$

where, $|x_{ff}^t|$ represents the count of the one or more first features extracted from the first target instance t; and $|x^t|$ represents the total count of the one or more first features and the one or more second features extracted from the first target instance t.

At step 308, a check is performed to determine whether the first score $\alpha$ of the predicted first label exceeds the first pre-specified threshold. In an embodiment, the processor 202 may be configured to perform the check to determine whether the first score of the predicted first label exceeds the first pre-specified threshold. In an embodiment, if the processor 202 determines that the first score $\alpha$ of the predicted first label exceeds the first pre-specified threshold, the control passes to step 310. Else control passes to step 312.

At step 310, the predicted first label is assigned to the first target instance. In an embodiment, the processor 202 may be configured to assign the predicted first label to the first target instance. In an embodiment, the processor 202 may be further configured to associate the one or more second features to the predicted first label. Control passes to step 320.

At step 312, when first score α of the predicted first label is less than the first pre-specified threshold, the second label for the received first target instance is predicted based on the one or more first features and the one or more second features by utilizing the trained second classifier. In an embodiment, the processor 202 may be configured to predict the second label for the received first target instance, when first score α of the predicted first label may be less than the first pre-specified threshold. The processor 202 may predict the second label for the first target instance based on the one or more first features and the one or more second features by utilizing the trained second classifier.

Prior to the prediction of the second label, the processor 202 may be configured to select a trained second classifier from one or more trained second classifiers. The one or more trained second classifiers are associated with the one or more source domains. In an embodiment, the processor 202 may be configured to identify a relevant source domain for the target domain from the one or more source domains.

A person having ordinary skill in the art will understand that if only one source domain is available, then the available source domain corresponds to the relevant source domain for the target domain.

In an embodiment, when multiple source domains are available, the processor 202 may utilize a trained domain classifier for the identification of the relevant source domain from the multiple source domains. In an embodiment, the trained domain classifier is trained based on the set of labeled source target instances. Thereafter, the processor 202 may utilize the trained second classifier associated with the identified relevant source domain for the prediction of the second label. In an embodiment, the trained second classifier may be associated with the first value that indicates the cost/price of utilization of the trained second classifier. For example, the processor 202 may receive the trained second classifier from a source database or one or more websites associated with the relevant source domain. Further, the one or more websites may charge the cost/price of utilization (i.e., the first value) for using the trained second classifier. In an embodiment, the first value of the trained second classifier may depend on the quality and quantity of training data used previously to train the second classifier. After utilizing the trained second classifier, the processor 202 may be configured to update the cumulative value associated with the set of labeled target instances by adding the first value to the previous cumulative value.

Thereafter, the processor 202 may be configured to determine the second score associated with the predicted second label. The second score associated with the predicted second label may correspond to a measure of confidence with which the trained second classifier has predicted the second label for the first target instance.

At step 314, a check is performed to determine whether the second score of the predicted second label exceeds the second pre-specified threshold. In an embodiment, the processor 202 may be configured to perform the check to determine whether the second score of the predicted second label exceeds the second pre-specified threshold. In an embodiment, if the processor 202 determines that second score of the predicted second label exceeds the second pre-specified threshold, the control passes to step 316. Else control passes to step 318.

At step 316, the predicted second label is assigned to the first target instance. In an embodiment, the processor 202 may be configured to assign the predicted second label to the first target instance. The processor 202 may be further configured to associate the one or more second features, extracted from the first target instance, with the predicted second label. Control passes to step 320.

At step 318, when the second score of the predicted second label is less than the second pre-specified threshold, the third label for the received first target instance is predicted based on the one or more first features and the one or more second features by utilizing the trained third classifier. In an embodiment, the processor 202 may be configured to predict the third label for the received first target instance, when the second score of the predicted second label is less than the second pre-specified threshold. The processor 202 may predict the third label based on the one or more first features and the one or more second features by utilizing the trained third classifier.

Prior to the prediction of the third label, the processor 202 may be configured to receive the trained third classifier from a target database or one or more websites associated with the target domain. Further, the one or more websites may charge the cost/price of utilization (i.e., the second value) for using the trained third classifier. After utilizing the trained third classifier, the processor 202 may be configured to update the cumulative value associated with the set of labeled target instances by adding the second value to the previous cumulative value. Thereafter, the processor 202 may further assign the predicted third label to the first target instance. The processor 202 may be further configured to associate the one or more second features, extracted from the first target instance, with the predicted third label.

At step 320, the set of labeled target instances associated with the target domain is updated based on the labeled first target instance. The updated set of labeled target instances is further utilized to train the target domain classifier. In an embodiment, the processor 202 may be configured to update the set of labeled target instances associated with the target domain. The processor 202 may update the set of labeled target instances by adding the labeled first target instance to the set of labeled target instances.

In an embodiment, the processor 202 may be further configured to update the one or more labeled target features by adding the labeled second features to the one or more labeled target features. In an embodiment, the processor 202 may further update the target feature log based on the predicted label (i.e., the first label or the second label or the third label). In an embodiment, the processor 202, in conjunction with the transceiver 206, may be configured to store the updated set of labeled target instances, the updated one or more labeled target features, and the updated target feature log in the database server 106.

Thereafter, the processor 202 may be configured to compare the current cumulative value with the pre-specified threshold value. In an embodiment, when the current cumulative value is below the pre-specified threshold value, the processor 202 may be configured to label another first target instance received from the user-computing device 102, in real-time. In an alternate embodiment, when the current cumulative value exceeds the pre-specified threshold value, the processor 202 may be configured to train the target domain classifier based on the updated set of labeled target instances and the updated one or more labeled target features.

After training the target domain classifier, the processor 202 may be configured to label the one or more target domain instances (i.e., second target instances in the set of second target instances) received sequentially, one at a time, from the user-computing device 102 associated with the user. Control passes to end step 322.

Figure 4:
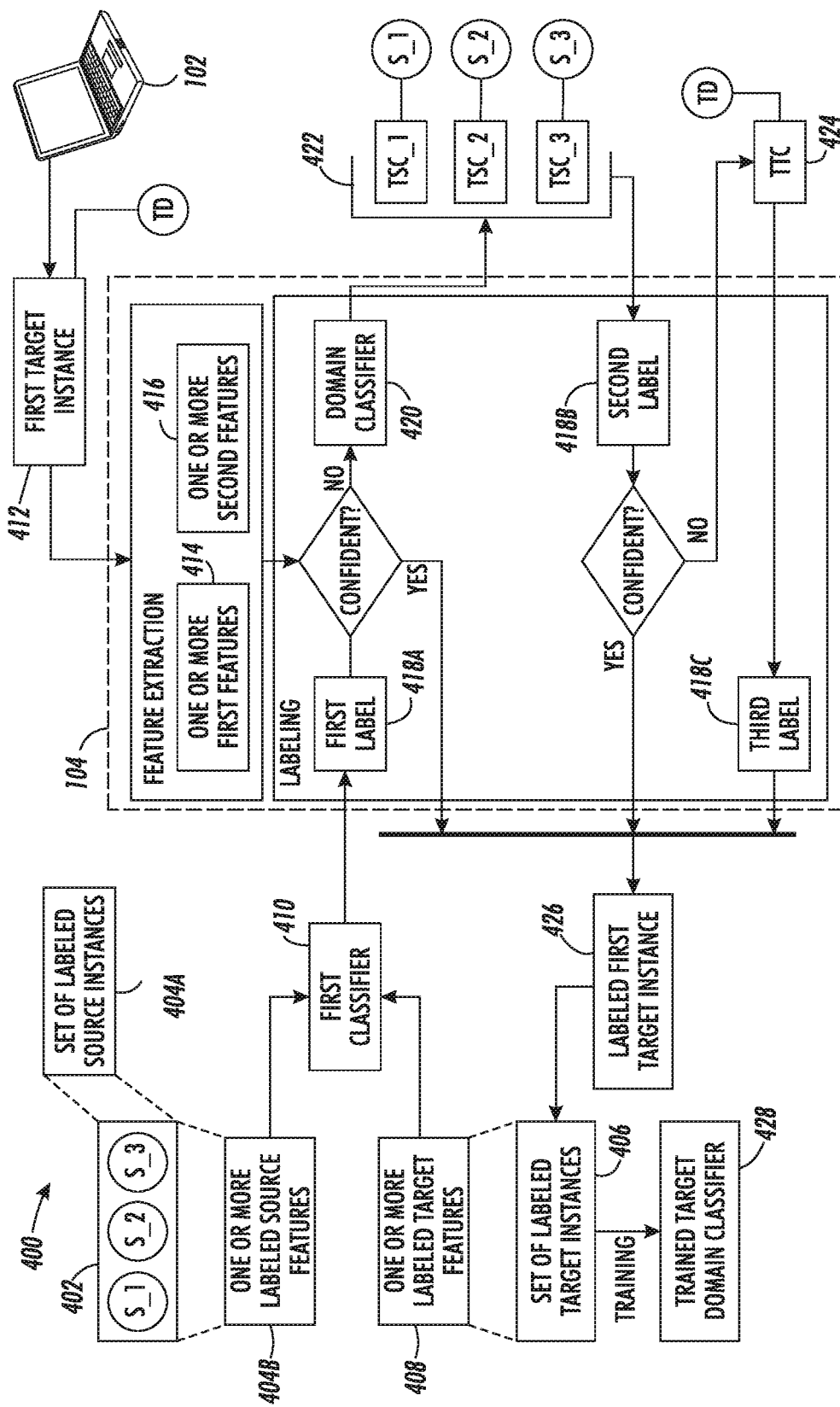
FIG. 4 is a block diagram that illustrates an exemplary scenario of processing data for training a target domain classifier, in accordance with at least one embodiment.

FIG. 4 is a block diagram that illustrates an exemplary scenario of processing data for training a target domain classifier, in accordance with at least one embodiment. FIG. 4 is described in conjunction with FIG. 1, FIG. 2, and FIGS. 3A and 3B. With reference to FIG. 4, there is shown an exemplary scenario 400 processing data for training the target domain classifier.

With reference to the exemplary scenario 400, there are shown one or more source domains 402. The one or more source domains 402 are associated with a set of labeled source instances 404A. Further, one or more labeled source features 404B are associated with the set of labeled source instances 404A. There is further shown a set of labeled target instances 406. Initially, the set of labeled target instances 406 is an empty set. When the set of labeled target instances 406 corresponds to an empty set, there may be no one or more labeled target features 408 of a target domain "TD" associated with the set of labeled target instances 406. Further, a trained first classifier 410 is already trained for labeling based on the set of labeled source instances 404A, the one or more labeled source features 404B, the set of labeled target instances 406, and the one or more labeled target features 408.

In an embodiment, the application server 104 receives a first target instance 412 from the user-computing device 102. Thereafter, the application server 104 may extract one or more first features 414 and one or more second features 416 from the first target instance 412. The one or more first features 414 correspond to features that are observed in the one or more labeled source features 404B and/or the one or more labeled target features 408. The one or more second features 416 correspond to features that are not observed in both the one or more labeled source features 404B and the one or more labeled target features 408. Thus, one or more first features 414 are associated with at least one label and the one or more second features 416 are independent of any label.

After feature extraction, the application server 104 may utilize the extracted one or more first features 414 and the one or more second features 416 for labeling the first target instance 412. The application server 104 may utilize the trained first classifier 410 to predict/assign a first label 418A for/to the first target instance 412 based on the one or more first features 414. Further, the application server 104 may determine a first score for the first label 418A based on a ratio between a count of the one or more first features 414 and a total count of the one or more first features 414 and the one or more second features 416. Thereafter, the application server 104 may check the confidence level of the trained first classifier 410 by comparing the first score with a first pre-specified threshold. In a scenario, when the first score exceeds the first pre-specified threshold the first label 418A may be assigned to the first target instance 412. Else, the application server 104 utilizes a domain classifier 420 to select a relevant source domain, such as "S_1", "S_2", or "S_3", for the target domain "TD". Further, the application server 104 may select a trained second classifier 422, such as "TSC_1", "TSC_2", or "TSC_3", associated with the relevant source domain, such as "S_1", "S_2", or "S_3", for predicting/assigning a second label 418B for/to the first target instance 412. In an embodiment, the trained second classifier 422 may be associated with the first value that corresponds to a cost of utilization of the trained second classifier 422. After the utilization of the trained second classifier 422, the application server 104 may add the first value to a cumulative value associated with the set of labeled target instances 406.

Thereafter, the application server 104 may check the confidence level of the trained second classifier 422 by comparing the second score with a second pre-specified threshold. In a scenario, when the second score exceeds the second pre-specified threshold the predicted second label 418B may be assigned to the first target instance 412. Else, the application server 104 utilizes a trained third classifier 424 associated with the target domain "TD" for predicting/assigning a third label 418C for/to the first target instance 412. In an embodiment, the trained third classifier 424 may be associated with the second value that corresponds to a cost of utilization of the trained third classifier 424. After the utilization of the trained third classifier 424, the application server 104 may add the second value to the cumulative value associated with the set of labeled target instances 406.

After labeling the first target instance 412, the application server 104 may further associate the one or more second features 416 with the assigned label (i.e., the first label 418A or the second label 418B or the third label 418C). Thereafter, the application server 104 may update the set of labeled target instances 406 by adding the labeled first target instance 426 to the set of labeled target instances 406. The application server 104 may further update the one or more labeled target features 408 by adding the labeled one or more second features 416 to the one or more labeled target features 408. In an embodiment, the application server 104 may further store the updated set of labeled target instances 406 and the updated one or more labeled target features 408 in the database server 106.

After the update, the application server 104 may compare the cumulative value with a pre-specified threshold value. In a scenario, when the cumulative value is less than the pre-specified threshold value, the application server 104 may label another first target instance received from the user-computing device 102. In another scenario, when the cumulative value exceeds the pre-specified threshold value the application server 104 may train a target domain classifier 428 based on the updated set of labeled target instances 406 and the updated one or more labeled target features 408. After training, the application server 104 may utilize the target domain classifier 428 to label a second target instance received in real-time from the user-computing device 102.

A person having ordinary skill in the art will understand that the abovementioned exemplary scenario is for illustrative purpose and should not be construed to limit the scope of the disclosure.

The disclosed embodiments encompass numerous advantages. The disclosure provides a method and a system for processing data by a computing device for training a target domain classifier. The disclosed method utilizes previous knowledge (i.e., a set of labeled source domain instances and one or more labeled source feature) associated with one or more source domains for training the target domain classifier. The disclosed method further utilizes external knowledge sources (i.e., a trained second classifier and/or a trained third classifier) extracted from one or more websites for training the target domain classifier. The disclosed method provides an optimal training of the target domain classifier by maintaining a budgetary constraint (i.e., cumulative value) during building of training data (i.e., a set of labeled target instances and one or more labeled target features). The disclosed method provides a robust and efficient means to train the target domain classifier for labeling the target domain instances, when the target domain instances are received sequentially in real time (i.e., one at a time).

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for processing data for training a target domain classifier have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of processing data by a computing device for training a target domain classifier, the method comprising:
    extracting, by one or more processors in a computing device, one or more first features and one or more second features from a first target instance, associated with a target domain, received from another computing device;
    training, by the one or more processors, a first classifier based on one or more labeled source features associated with a set of labeled source instances and/or one or more labeled target features associated with a set of labeled target instances;
    predicting, by the one or more processors in the computing device, a first label for the received first target instance based on the one or more first features by utilizing the trained first classifier, wherein the predicted first label is determined as:

$$Y = \frac{\text{argmax} P(Y = y_k)}{y \in Y} \prod_i P(x_i^f | Y = y_k)$$

where:
- Y represents the predicted first label,
- $x_i^l$ represents an $i^{th}$ feature in the one or more first features of the first target instance, and
- $y_k$ represents a label associated with a feature same as $x_i^l$ in the source feature log and/or the target feature log with a maximum count;

determining a first score based on a ratio between a count of the one or more first features and a total count of the one or more first features and the one or more second features;

assigning the predicted first label to the first target instance when the first score of the predicted first label exceeds a first pre-specified threshold;

assigning the predicted first label is assigned to the one or more second features;

updating, by the one or more processors in the computing device, the set of labeled target instances associated with the target domain based on the labeled first target instance, wherein the updated set of labeled target instances is utilized to train the target domain classifier when a cumulative value associated with the set of labeled target instances exceeds a pre-specified threshold value; and predicting, by the one or more processors in the computing device, a second label for the received first target instance based on the one or more first features and the one or more second features by utilizing a trained second classifier associated with a source domain when the first score of the predicted first label is less than the first pre-specified threshold, wherein the predicted second label is assigned to the first target instance when a second score associated with the predicted second label exceeds a second pre-specified threshold.

2. The method of claim 1, wherein the one or more first features are associated with the set of labeled source instances or the set of labeled target instances, wherein the one or more second features are independent of the set of labeled source instances and the set of labeled target instances.

3. The method of claim 1, wherein the trained second classifier is associated with a first value, wherein the first value is added to the cumulative value associated with the set of labeled target instances.

4. The method of claim 1, further comprising predicting, by the one or more processors in the computing device, a third label for the received first target instance based on the one or more first features and the one or more second features by utilizing a trained third classifier associated with the target domain when the second score of the predicted second label is less than the second pre-specified threshold, wherein the predicted third label is assigned to the first target instance.

5. The method of claim 4, wherein the trained third classifier is associated with a second value, wherein the second value is added to the cumulative value associated with the set of labeled target instances.

6. The method of claim 1, wherein the set of labeled target instances is associated with one or more labeled target features, wherein the one or more labeled target features comprises the one or more first features.

7. The method of claim 6, further comprising updating, by the one or more processors in the computing device, the one or more labeled target features based on the labeled one or more second features.

8. The method of claim 1, wherein the trained target domain classifier is utilized to label a second target instance received from the other computing device.

9. The method of claim 8, wherein the first target instance and the second target instance correspond to an image, a text segment, or an audio segment.

10. A system for processing data by a computing device for training a target domain classifier, the system comprising:
one or more processors in a computing device configured to:
extract one or more first features and one or more second features from a first target instance, associated with a target domain, received from another computing device;
train a first classifier based on one or more labeled source features associated with a set of labeled source instances and/or one or more labeled target features associated with a set of labeled target instances;
predict a first label for the received first target instance based on the one or more first features by utilizing a trained first classifier associated with a set of labeled source instances, wherein the predicted first label is determined as:

$$Y = \genfrac{}{}{0pt}{}{\text{argmax} P(Y = y_k)}{y \in Y} \prod_i P(x_i^l | Y = y_k)$$

where:
- Y represents the predicted first label,
- $x_i^l$ represents an $i^{th}$ feature in the one or more first features of the first target instance, and
- $y_k$ represents a label associated with a feature same as $x_i^l$ in the source feature log and/or the target feature log with a maximum count;

determine a first score based on a ratio between a count of the one or more first features and a total count of the one or more first features and the one or more second features;

assign the predicted first label to the first target instance when the first score of the predicted first label exceeds a first pre-specified threshold;

assign the predicted first label to the one or more second features;

update a set of labeled target instances associated with the target domain based on the labeled first target instance, wherein the updated set of labeled target instances is utilized to train the target domain classifier when a cumulative value associated with the set of labeled target instances exceeds a pre-specified threshold value; and predict, by the one or more processors in the computing device, a second label for the received first target instance based on the one or more first features and the one or more second features by utilizing a trained second classifier associated with a source domain when the first score of the predicted first label is less than the first pre-specified threshold, wherein the predicted second label is assigned to the first target instance when a second score associated with the predicted second label exceeds a second pre-specified threshold.

11. The system of claim 10, wherein the one or more first features are associated with the set of labeled source instances or the set of labeled target instances, wherein the one or more second features are independent of the set of labeled source instances and the set of labeled target instances.

12. The system of claim 10, wherein the trained second classifier is associated with a first value, wherein the first value is added to the cumulative value associated with the set of labeled target instances.

13. The system of claim 10, wherein the one or more processors in the computing device are further configured to predict a third label for the received first target instance based on the one or more first features and the one or more second features by utilizing a trained third classifier associated with the target domain when the second score of the predicted second label is less than the second pre-specified threshold, wherein the predicted third label is assigned to the first target instance.

14. The system of claim 13, wherein the trained third classifier is associated with a second value, wherein the second value is added to the cumulative value associated with the set of labeled target instances.

15. The system of claim 10, wherein the set of labeled target instances is associated with one or more labeled target features, wherein the one or more labeled target features comprises the one or more first features.

16. The system of claim 15, wherein the one or more processors in the computing device are further configured to update the one or more labeled target features based on the labeled one or more second features.

17. The system of claim 10, wherein the trained target domain classifier is utilized to label a second target instance received from the other computing device.

18. A computer program product for use with a computer, the computer program product comprising a non-transitory computer readable medium, wherein the non-transitory computer readable medium stores a computer program code of data processing for training a target domain classifier, wherein the computer program code is executable by one or more processors in a computing device to:
  extract one or more first features and one or more second features from a first target instance, associated with a target domain, received from another computing device;
  train a first classifier based on one or more labeled source features associated with a set of labeled source instances and/or one or more labeled target features associated with a set of labeled target instances;
  predict a first label for the received first target instance based on the one or more first features by utilizing a trained first classifier associated with a set of labeled source instances, wherein the predicted first label is determined as:

$$Y = \frac{\mathrm{argmax} P(Y = y_k)}{y \in Y} \prod_i P(x_i^l | Y = y_k)$$

where:
    Y represents the predicted first label,
    $x_i^l$ represents an $i^{th}$ feature in the one or more first features of the first target instance, and
    $y_k$ represents a label associated with a feature same as $x_i^l$ in the source feature log and/or the target feature log with a maximum count;
  determine a first score based on a ratio between a count of the one or more first features and a total count of the one or more first features and the one or more second features;
  assign the predicted first label to the first target instance when the first score of the predicted first label exceeds a first pre-specified threshold:
  assign the predicted first label to the one or more second features;
  update a set of labeled target instances associated with the target domain based on the labeled first target instance, wherein the updated set of labeled target instances is utilized to train the target domain classifier when a cumulative value associated with the set of labeled target instances exceeds a pre-specified threshold value; and
  predict, by the one or more processors in the computing device, a second label for the received first target instance based on the one or more first features and the one or more second features by utilizing a trained second classifier associated with a source domain when the first score of the predicted first label is less than the first pre-specified threshold, wherein the predicted second label is assigned to the first target instance when a second score associated with the predicted second label exceeds a second pre-specified threshold.

* * * * *